United States Patent [19]

DenBesten

[11] Patent Number: 5,362,181
[45] Date of Patent: Nov. 8, 1994

[54] IN PLACE STABILIZATION OF PRE-EXISTING LANDFILLS

[75] Inventor: Leroy DenBesten, Valatie, N.Y.

[73] Assignee: Denbesten Enterprises, Inc., South Schodack, N.Y.

[21] Appl. No.: 506,913

[22] Filed: Apr. 9, 1990

Related U.S. Application Data

[63] Continuation-in-part of Ser. No. 424,068, Oct. 19, 1989, abandoned.

[51] Int. Cl.$^5$ ............................................. B09B 1/00
[52] U.S. Cl. .................................. 405/129; 405/131; 71/9
[58] Field of Search ............... 405/128, 129, 130, 131; 210/628, 520; 71/9, 901; 241/DIG. 38

[56] References Cited

U.S. PATENT DOCUMENTS

| | | | |
|---|---|---|---|
| 3,614,867 | 10/1971 | Nieman | 405/129 |
| 3,703,462 | 11/1972 | Smith | 210/628 |
| 4,028,130 | 6/1977 | Webster et al. | 405/129 X |
| 4,104,048 | 8/1978 | Urbancyk | 71/9 |
| 4,264,352 | 4/1981 | Houser | 241/DIG. 28 |
| 4,410,142 | 10/1983 | Carlson | 241/18 |
| 4,781,944 | 11/1988 | Jones | 405/129 X |
| 4,961,542 | 10/1990 | DenBesten et al. | 241/101.7 |

OTHER PUBLICATIONS

Smith & Mahoney, P.C., The Greater Albany Sanitary Landfill Cap Repair Phase I Project Manual, p. i, pp. 105–117, Jun. 1989.

*Primary Examiner*—Randolph A. Reese
*Assistant Examiner*—John Ricci
*Attorney, Agent, or Firm*—Kane, Dalsimer, Sullivan, Kurucz, Levy, Eisele & Richard

[57] ABSTRACT

A process is disclosed for the reduction of landfill material and biodegradable refuse which comprises the aeration and wetting of the refuse to facilitate anaerobic decomposition processes. Aeration is achieved by mixing and agitating the refuse.

13 Claims, No Drawings

IN PLACE STABILIZATION OF PRE-EXISTING LANDFILLS

This is a continuation in part of U.S. application Ser. No. 07/424,068, filed on Oct. 19, 1989, now abandoned.

BACKGROUND

The problems of waste management have been well documented. Our society is experiencing a crisis due to the closing of our landfills, as they are filled to capacity. For various reasons, the opening of new landfill sites is not a viable alternative. The unpleasant odors, the vermin and the rodents associated with landfills make the placement of such sites unwelcome and unwanted in communities throughout the land. Yet the need for a solution increases as the garbage piles up.

In the ordinary landfill, refuse is dumped into a hole or some other excavated site and then covered with topsoil or other earth covering. This process is repeated continuously, one layer upon another, raising the level of the land. While methods have been developed which permit the aeration of the buried refuse, these methods do not substantially accelerate the decomposition process. For instance, in U.S. Pat. No. 4,483,641, a waste disposal landfill is disclosed having a series of air intake pipes and exhaust pipes extending from the atmosphere through the covering layer and into the garbage heap. However, such ventilation means, which are intended to evaporate accumulated water, are not appropriate for the purposes of expediently reducing the volume of garbage through an accelerated decomposition process. This is because air flow is localized within particular regions of the landfill.

The disadvantage of capping a landfill is that it prevents water (as well as air) from commingling with the refuse. As a result, the natural decomposition processes are inhibited. A typical capped landfill is no more than a stagnant, nonbiodegrading pile of refuse. This is despite the fact that they are largely composed of paper products and other biodegradables. A recent observation of garbage in a landfill which had been agitated revealed newspapers dating back to 1980 which were readable and fully in tact.

It has been found that aerobic treatment of landfill material, where air and water are mixed with solid waste, results in a 7 to 10 times faster decomposition than an anaerobic treatment that lacks water and air. Furthermore, if the pH of the environment is below 4 then decomposition ceases to occur, which will inevitably result as without water and air, hydrogen sulfide ($H_2S$) is generated. Aerobic processes are less sensitive to changes in pH.

SUMMARY OF INVENTION

It is proposed that one method of alleviating the garbage crisis would be to expedite the natural process of the decomposition of biodegradable materials. However, it has been determined decomposition will occur only in the presence of air and moisture.

In order to achieve an effective accelerated process, it has been found that it is necessary to aerate the site and occasionally stir up the refuse on a periodic basis in order to insure a complete aeration of the mixture. Furthermore, it is desirous to wet the refuse and aerate it on a periodic basis, since water and air serves to accelerate the decomposition process.

This invention discloses a process which will reduce the volume of biodegradable refuse in landfills which are closed or are on the verge of being closed. The process is also applicable to reducing the volume of newly disposed refuse as it is disposed upon its arrival at landfills.

When a particular site is filled to capacity it is accepted practice to cap the landfill with a layer of compacted clay, or impermeable membrane, such as plastic, or an approved design by the Federal, State or municipal Government or a design or a state engineer. By capping off a landfill the malodorous scents are contained. The clay layer further prevents water from seeping through the refuse, which could create undesirable leachate that upon seeping into ground water would contaminate drinking water supplies.

Moistening and aerating landfill material has clear beneficial results. When a moistened pile of refuse is commingled with air the decomposition of that pile will occur, resulting in a substantial reduction of volume caused by aerobic decomposition. Even prior to a passage of time a reduction of volume will occur. Upon the aerating and moistening of a paper product, the paper becomes matted and reduced to a smaller volume. Once agitated, the wetted materials break down to smaller pieces, further reducing the volume. This process of exposing refuse to air and water and mixing it is known as in place stabilization.

Reduction of volume has clear economic benefits to municipalities and other landfill operators, as a unit price has been placed upon raw garbage ($100/ton) air space ($18/yd) and daily cover ($7/yd$^2$). By reducing the volume of refuse, the cost to landfill operators is substantially reduced. This is readily apparent as state and municipal laws set the permissible height of landfills. Space is finite, and so as the landfill approaches its full capacity the value of available space increases.

It is an object of the present invention to provide a method for accelerating the decomposition process of biodegradable refuse.

It is a further object of the invention to cause an immediate reduction of volume of refuse treated by the method.

It is a further object of the invention to provide such a method which can be applied conveniently and economically to existing landfills.

It is a further object of the invention to increase the air space or volume of an existing landfill 20 to 25%.

It is a further object of the invention to provide a method for accelerating the decomposition of biodegradable refuse which will conserve the space of existing landfills and increase the useful life of the landfill.

It is a further object of the invention to separate biodegradable refuse from nonbiodegradable refuse.

Other objects of the invention shall become apparent from the description thereof found below.

When exposed to adequate amounts of air and moisture, biodegradable refuse can be reduced in volume by 50 to 80% in about 360 days depending upon the composition of the materials. This requires proper mixture of the refuse, as well as aeration and moistening of the refuse. As refuse is brought to a landfill site the biodegradable materials are separated from the nonbiodegradable materials, such as cans or bottles. A separation process of this sort can be achieved by the use of a screening machine obtainable from DenBesten, Inc., Westlyn Grove, Box 344, Valatie, N.Y. 12184. The biodegradable material is then placed into an excavated site and covered with earth, top soil, or an acceptable cover designed by an environmental engineer, or which meets Federal and State regulations. The garbage is moistened with voluminous amount of water either before it is covered or after it is covered, in the latter case by moistening the covered earth with water or leachate. The volume of water used varies dependent upon the size of landfill area treated by the process, but should be sufficient to saturate the area with many inches of water. The moisturization causes an immediate reduction of volume. Periodically, the site is excavated and the garbage is mixed and aerated, as well as remoistened, and then the earthen cover is replaced. This process is repeated periodically in order to decrease the volume of the garbage to the desired amount. A periodic covering of lime is optionally applied to the landfill surface in order to cut the stench. An additional reduction of volume can be achieved through the use of a material reducer which grinds the refuse. Such a device is disclosed in pending U.S. application 306,450, now U.S. Pat. No. 4,961,542 assigned to DenBesten, Inc.

DETAILED DESCRIPTION OF THE PREFERRED EMBODIMENT

As refuse is brought to the landfill site, it will require a sorting of biodegradables from the non-biodegradable materials. Most communities require their citizens to presort prior to disposal of its garbage, while others impose no such duties. Therefore, the extent of presortment will vary from site to site. However, a mechanical sorter which should be able to achieve satisfactory results for most communities is available from DenBesten, Inc. at the address listed above.

Once the non-biodegradable material has been sorted from the biodegradable material, the latter is brought to the actual excavation site. The nonbiodegradable material incapable of either recycling or composting should be incinerated. The excavation can be created by any of the means known in the art, but should be of a width of depth that is sufficient to insure adequate mixing of the refuse. The refuse is then placed into the excavation where it is initially moistened with a large volume of water or leachate in order to accelerate the rotting process. It should be noted that raw sewage diluted with water or leachate may also be used to moisten the refuse, and the use thereof would greatly accelerate the decomposition process. In the context of the present invention, raw sewage refers to raw, treated sewer sludge and sewage. However, the use of raw sewage may not be appropriate in situations where the landfill site does not have a liner. Any other approved liquid can be used as well.

When the excavation has been filled to the desired level top soil or some other earthen covering is placed upon the garbage heap. The refuse can be irrigated as it lies in the excavation by wetting the earthen covering with either water or leachate.

Every two or three weeks or monthly, in order to insure that the decomposition is occurring properly the present invention contemplates mixing and aerating the refuse. Agitation and mixing should occur within the 10 to 15 feet of refuse below the surface. A rotor tiller device is capable of penetrating 8 to 20 feet below the surface. It should be noted that a bulldozer is acceptable for the agitation. At that time earthen covering is removed and the garbage is exposed. The garbage can also be mixed by use of a device such as a rotor tiller type machine. This machine is available from DenBesten, Inc. at the address listed above. The mixing operation insures that all of the garbage placed in the excavation is sufficiently exposed to air and moisture to insure that the decomposition process is complete. At that time the refuse should be remoistened with water, leachate, or raw sewage. It is preferred that the mixing process occur every two to three weeks or else the decomposition process will become anaerobic, causing the decomposition process to proceed 7 to 10 times slower than the aerobic process.

The wetting of the refuse and the aeration thereof by mixing causes the refuse to undergo composting. The composting action is observable as the composting refuse generates heat and emits a visible methane vapor. The generation of methane must be controlled, as the refuse is capable of exploding or combusting in situations where excess methane is generated. For this reason, care must be taken to insure that the refuse is not oversaturated with water, as methane generation is proportional to the amount of moisture added to the refuse. Control can be achieved by closely monitoring the temperature of the decomposing material by inserting temperature probes within the composting mass. Temperatures should be kept below 140° F. Therefore, the amount of water to be used, or whether the use of water should be discontinued, is dependent upon the temperature of the mass and its approach to 140° F.

In practicing the invention to obtain the agitation and consequently aeration coupled with moisture to enhance decomposition, the dozers with each pass will take 6 inches to a foot off of the land fill. The depth of each pass facilitates odor control. If the dozer goes to deep, larger odor emissions occur.

Eventually in eliminating the entire land fill after decomposition and composting has been obtained, the stabilized material will be screened to remove all of the non-biodegradable materials. In the end, relatively clean stabilized soil will result.

Daily cover is normally about 6 inches thick and in the prior art serves to seal off water and air, and prevents both from getting into the raw garbage. This is found to be an unacceptable way, and does not result in composting of the garbage.

Daily cover in the form of clean dirt is normally $7–$20/yd. The stabilized material produced by the invention when used as daily cover is free.

It has been found that stabilized soil produced according to the invention which contains all recyclables, such as plastic, metal, shoes, (no tires) is preferred daily cover, because the presence of this material serves as reinforcement (as in reinforced concrete) that gives the daily cover more strength to support greater loads, such as that of vehicles or people. It has been found that this support far exceeds that capable of being obtained from clean dirt. Furthermore, clean dirt readily washes away when exposed to rain, whereas stabilized soil does not, because of the presence of all of these foreign materials, so that in addition to strength, the materials add more integrity to the daily cover of material.

In actual practice and particularly in the prior art, vehicles would often get stuck at land fills in extremely wet daily cover of clean dirt.

In accordance with conventional practice, the daily cover is compacted with a roller with steel wheels or teeth. This device is called a trash compactor.

In order to control the odors which are indigenous to landfill environments an optional covering of lime may be applied periodically. The alkalinity of lime also serves as a means for adjusting the pH of the material to insure that the process remains aerobic. The lime may be applied by any known existing mechanical or manual means.

In practicing the invention one may opt to further reduce the volume of refuse through the use of a material reducer, as set forth above.

According to the above process, the inventor realizes a 50 to 80% reduction in volume of garbage within 360 days or as required, depending on the material. As the volume is reduced over a period of time, fresh garbage may be added to the excavation to replace the decomposed refuse. By following the teachings of the invention, it is possible to realize a conservation of valuable landfill space.

Thus, the present invention embodies a process applicable to the reduction of volume of refuse that is either already stored or is newly disposed at the landfill site. It can also be applied to raw garbage outside of the landfill setting. Furthermore, it is of no importance whether the landfill subjected to the process is capped or uncapped, as the cap of a landfill can be removed prior to commencing the process. It is apparent to one skilled in the art that not all steps of the process are applicable in every instance. For example, one need not create an excavation for presently stored refuse, as the excavation would be preexisting. Likewise, the sorting step, which could occur immediately upon the arrival of new refuse, would not occur until or after the occurrence of in place stabilization for presently stored refuse. The process is adaptable to the situation at hand. It is readily apparent that many of the inventive steps are interchangeable and need not be carried out in any particular order.

I claim:

1. A process for reducing the volume of a pre-existing landfill formed initially by placing decomposable landfill materials at a landfill site and covering said landfill materials with a suitable earth cover, thereafter removing the cover from the landfill materials, mixing the decomposable landfill materials at the landfill site, aerating the decomposable landfill materials at the landfill site, and moistening the decomposable landfill materials at the landfill site, said mixing, aerating, and moistening steps occurring on a periodic basis thereby inducing and accelerating the decomposition of the decomposable landfill materials whereby the volume of the decomposable landfill materials is reduced further comprising the step of reducing the volume of the refuse by mechanical means, the material reduction by mechanical means being accomplished by the use of a material reducer.

2. A process according to claim 1 whereby the mixing, aerating and moistening steps are each carried out two to three week cycles.

3. A process according to claim 1 whereby the decomposable materials are moistened with at least one part water.

4. A process according to claim 1 whereby the decomposable materials are moistened with at least one part leachate.

5. A process according to claim 1 whereby the decomposable material is moistened with at least one part raw sewage.

6. A process according to claim 1 whereby the mixing is accomplished by mechanical means.

7. A process according to claim 6 whereby the mixing is accomplished by use of a rotor tiller.

8. A process according to claim 1 whereby nonbiodegradable materials are sorted from the biodegradable materials.

9. A process according to claim 8 wherein the nonbiodegradable materials are incinerated.

10. A process according to claim 1 whereby aerating occurs by mechanical means.

11. The process according to claim 1 wherein a periodic covering of lime is applied to the surface of the decomposable materials.

12. The process according to claim 1 wherein a 20 to 25 percent reduction of material volume is realized.

13. A process according to claim 1 wherein the resulting product of the process is stabilized soil suitable for use as daily cover.

* * * * *